United States Patent Office 3,292,957
Patented Dec. 20, 1966

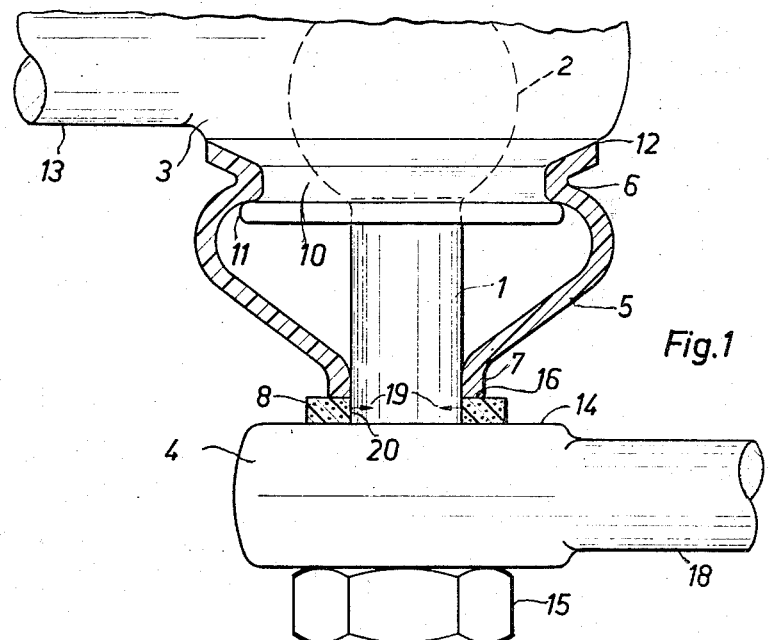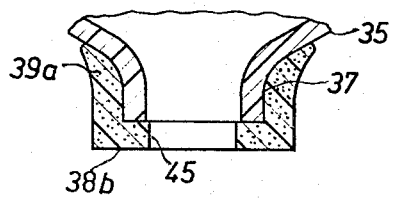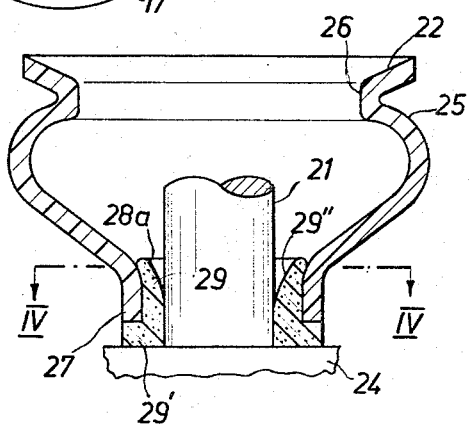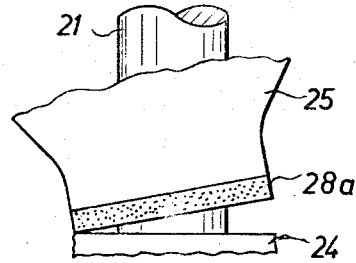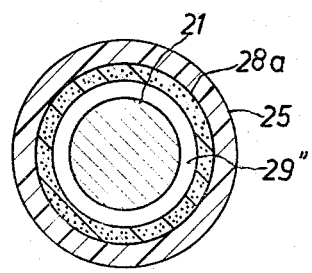

3,292,957
SEALED BALL-TYPE JOINTS AND THE LIKE
Jürgen Ulderup, Lemforde 207,
Hannover, Germany
Filed Jan. 20, 1964, Ser. No. 339,573
3 Claims. (Cl. 287—87)

My present invention relates to ball-type joints and like systems wherein two members are joined together for relative displacement about two mutually perpendicular axes and, more particularly, to systems of this type which are provided with sealing means for preventing contamination of the joint by foreign matter.

In my copending application Ser. No. 298,903, filed July 31, 1963, I have disclosed and claimed a novel ball-type joint particularly suited for use in steering linkages and like automotive applications, such joints being commonly provided between the drag-link and the steering tierods, knuckle arms and pitman arm. For the most part, ball-type joints of this character comprise a ball-shaped member or head mounted upon a shaft or stud and received within housing means forming a spherical socket for the ball-shaped member. It is known to provide these ball joints with a protective sleeve which has heretofore been composed of rubber or the like and prevents contamination of the joint and the loss of lubricant therefrom. It must be observed, in this connection, that ball-type joints for the steering linkages of automative linkages are prone to frictional deterioration and must be composed of materials unaffected by oil and maintained free from contamination by dust, soils, water and the like which might result in binding between the members forming the joint. Earlier seals for this purpose have been composed of natural or synthetic rubber and were designed to embrace the co-operating members forming the joint. Rubber seals of this nature were not capable of withstanding relative movement of the joint members where long periods of time were involved and were especially disadvantageous when relative angular displacements of large angles were required. In ball-type joints of steering linkages, for example, it is frequently necessary that the two members constituting the joint swing relatively through an angle of about 65°, a relative movement capable of stressing the seal sharply and, in fact, drawing the latter away from the joint members to permit access of contaminants to the socket and ball-shaped members.

It is, therefore, the principal object of the present invention to provide a ball-joint system, particularly suitable for use in the steering linkages of an automotive vehicle, wherein the aforementioned disadvantages can be avoided and the function of the ball joint is substantially unaffected by contamination from an external source.

A further object of the present invention is to provide an improved seal for a ball-joint system of the character described.

Yet another object of this invention is to provide means for sealing a joint between a pair of relatively displaceable members wherein the seal can be maintained even under large relative angular displacement of the members.

These objects, and others which will become apparent hereinafter, are attained, in accordance with the present invention, through the provision of a ball-type joint which comprises a housing member forming a generally spheroidal socket and a ball-shaped member receivable in the socket with freedom of angular displacement relative to the housing means, the ball-shaped member being provided with a shaft or stud connectable to one element of the steering linkage while the housing means is connected to another element thereof. The ball-shaped member and the socket can be constituted as described and claimed in my above-identified copending application. The present invention resides primarily in the provision of a ball joint of this character having sealing means in the form of a frustoconical sleeve of oil-resistant synthetic-resin material (preferably a polyurethane resin) which is noncellular and has a narrow portion hugging the elongated member or shaft of the ball-shaped element at the narrow extremity of the sleeve. In accordance with the present invention, this narrow extremity of the sleeve is provided with a cuff portion of elastomeric synthetic-resin material of higher resilience than the material constituting the remainder of the sleeve and adapted to maintain total peripheral contact with the shaft under resilient compression in all relative positions of the joint members. It is an important characteristic of the present invention that the elastomeric material of the sealing sleeve, which is generally funnel-shaped so as to permit axial and angular displacement of its wider and narrower extremities without the other extremity being drawn along to a significant extent, be noncellular while the cuff portion is composed of a cellular synthetic-resin material advantageously having a chemical composition similar to that of the sleeve.

According to a more specific feature of this invention, the cuff portion is formed of the foamed synthetic resin and is highly resilient while the remainder of the sleeve is composed of the nonfoamed elastomer but is somewhat less resilient. More particularly, it should be pointed out that the cuff portion can, in accordance with the principles of the present invention, be formed integrally with the sleeve during, for example, a molding operation wherein nonexpandable polyurethane is disposed in that portion of the mold corresponding to the sleeve and expandable polyurethane is disposed adjacent the narrow extremity of the sleeve part of the mold so as to be rendered integral with the sleeve upon curing of the synthetic resin.

I have discovered that excellent results are obtained when the cuff portion is provided with a base axially abutting the narrow extremity of the sleeve and bearing directly against the shaft along annular zone in the region of this narrow extremity, the cuff portion having an axially extending flange overlying an axially extending surface of the sleeve. Thus it is a significant feature of the present invention that the cuff portion is bonded to or integral with the sleeve along the axially extending inner or outer peripheries of the latter directly adjacent the narrow extremity. The high resilience and yieldability of the cellular cuff portion ensures that the seal will at its narrow portion permanently hug the shaft and is never withdrawn therefrom.

The above and other objects, features and advantages of the present invention will become more readily apparent from the following description, reference being made to the accompanying drawing in which:

FIG. 1 is an elevational view of a ball-joint system in accordance with the present invention showing the sealing means therefor in axial cross-section;

FIG. 2 is a fragmentary view of a joint of the type shown in FIG. 1, illustrating a modified sealing means;

FIG. 3 is an axial cross-sectional view through the narrow portion of a funnel-shaped sleeve and its cuff portion according to a further modification;

FIG. 4 is a cross-sectional view taken along the line IV—IV of FIG. 2; and

FIG. 5 is an elevational view of the narrow portion of the sealing means of FIG. 2 in a condition of the ball joint wherein the members thereof are in a limiting relative angular position.

In FIG. 1 I show a shaft 1 having a ball-shaped head 2 received within a housing 3 with freedom of angular displacement relative thereto about two mutually perpendicular axes, i.e. with two degrees of freedom. The housing 3 and ball-shaped member 2 can be constituted as illustrated in my copending application Ser. No. 298,903, filed July 31, 1963. Housing 3 is provided on an element 13 consituting part of the steering linkage of an automotive vehicle and can be formed on an extremity of a steering-linkage tierod, for example, with shaft 1 being mounted in an eye 4 of another element 18 of the steering linkage, i.e. its knuckle arm. A nut 15, threadedly engageable with the screw threads 17 of shaft 1 holds the latter and the ball-shaped member 2 in place in eye 4. The housing 3 is provided with an annular groove 10 surrounding the ball-shaped member 2 and receiving an annular body 6 at the wide extremity of a funnel-shaped sealing boat or sleeve 5 composed of elastomeric synthetic resin; a noncellular polyurethane resin is particularly suitable for this purpose.

A frustoconical surface 12 of the sleeve 5 bears against a complementary surface of the housing 3 while a transverse flange 11 of the latter prevents axial slippage of the bead 6 of the sleeve. The groove 10 lies generally in a plane transverse to the axis of shaft 1. The narrow portion 7 of the sleeve 5 resiliently embraces the shaft 1 at a location axially spaced from the ball-shaped member 2 and is directly adjacent a cuff portion 8 of cellular elastomeric resin. The latter has a greater elasticity and yieldability than possessed by the narrow portion 7 of the sleeve 5 and bears against an annular zone 15 of the shaft 1 uniformly in the radial direction (arrows 19) so as to hug its shaft in all relative positions of the joint members. In FIG. 5, it may be noted that an angular displacement of the shaft 1 with respect to the plane of groove 6 to its limiting position (e.g. through 65°), will result in a smaller displacement of the cuff portion of the sleeve which maintains its sealing engagement with the periphery of the shaft member 1. At the interface 16 between the cuff portion 8 and the narrow extremity 7 of the sleeve 5, the cuff portion can be bonded to a sleeve by a polyurethane adhesive or formed integrally therewith as previously described. In most circumstances, however, the cuff portion 8 will maintain itself in abutting relationship with the transverse surface 14 of eye 4.

In FIGS. 2, 4 and 5 I show a modified sealing arrangement wherein the sleeve 25 again is formed with a frustoconical flange 22, adapted to lie against a complementary surface of the ball-joint housing, and a constricted bead 26 at the wide extremity of sleeve 25 adapted to be seated within a groove of the housing. The cuff portion 28a of this seal has a base 29' axially abutting the narrow extremity 27 of sleeve 25 and an axially extending flange 29 overlying the inner periphery of the sleeve adjacent this narrow extremity. Thus only the cuff portion of the seal at this narrow extremity bears directly against the ball-member shaft 21. To permit some degree of angular movement of the cuff portion with respect to the shaft 21 hugged thereby (see FIG. 5), the inner surface of the inner flange of cuff portion 28a is flared outwardly at 29" toward the head of the sleeve.

In the modification of FIG. 3 the narrow extremity 37 of sleeve 35 is overlain by a flange 39a axially extending along the outer periphery of the sleeve and integral with a cuff portion 38b whose opening 45 is shown to have a diameter slightly smaller than that of the diameter of the shaft upon which it is to be mounted. The arrangements of FIGS. 2 and 3 cushion the seal at its narrow extremity when the distortion of the sleeve might otherwise be such as to approach the plastic-deformation point of the noncellular material constituting the sleeve. Under these circumstances, the cellular cuff portion takes up the relative movement of the seal and the joint members to prevent tearing or permanent distortion of the sleeve.

The invention as described and illustrated is believed to admit of many modifications and variations within the ability of persons skilled in the art, all such modifications and variations being deemed to be included within the spirit and scope of the appended claims.

What is claimed is:
1. A ball-joint assembly, comprising housing means forming a socket; a generally ball-shaped member received in said socket, said housing having an annular groove on its outer periphery and lying generally in a plane transverse to the socket axis, said member having a shaft extending generally transversely to said plane and outwardly of said socket, and a frustoconical boot sleeve of an elastomeric oil-resistant, noncellular synthetic-resin material of relatively low resilience surrounding said shaft, said boot sleeve having its large end received in said groove and its small end axially spaced from said large end, said small end being provided with an annular L-sectioned cuff portion on its inner periphery, said cuff portion being of relatively highly resilient and cellular foam synthetic-resin material and elastically hugging said shaft at a location axially spaced from said groove, said annular L-sectioned cuff portion having its axially extending annular flange between and separating the sleeve entirely from said member and with one end of said flange, having its inner peripheral surface lying along said member and flared radially outwardly away from said member and in the direction of said larger end and with the other end of said flange having a portion extending radially outwardly therefrom and engaging the bottom of said boot sleeve.

2. A ball-joint assembly as defined in claim 1 wherein said boot sleeve is composed of noncellular polyurethane and said L-sectioned cuff portion is composed of a foam polyurethane and the boot sleeve is generally bell-shaped, said wide extremity of said sleeve being formed with an inwardly extending bead received in said groove and an outwardly flared portion adapted to lie along a flank of said groove remote from said L-sectioned cuff portion.

3. A seal for the junction of an elongated member and a body extending generally transversely thereto, comprising a generally conical boot sleeve of oil-resistant elastomeric noncellular synthetic-resin material surrounding said member and having a large end and a small end, said sleeve at said large end having an inwardly extending annular bead portion to bear annularly against said body and receivable in an annular recess of said body, and an annular L-sectioned cuff portion of resilient cellular foam synthetic resin material at said small end of said sleeve and on its inner periphery, said cuff resiliently hugging said member at a location axially spaced from said body, said annular cuff portion having its axially extending annular flange between and separating the sleeve entirely from said member and with one end of said flange having an inner peripheral surface lying along said member and flared radially outwardly away from said member and in the direction of said wide end and with the other end of said flange having a portion extending radially outwardly therefrom and engaging the bottom of said boot sleeve.

References Cited by the Examiner
UNITED STATES PATENTS

| 2,304,732 | 12/1942 | Flumerfelt. |
| 2,922,836 | 1/1960 | Brown _____ 277—227 X |
| 2,974,975 | 3/1961 | Thomas. |
| 3,139,274 | 6/1964 | Hodgkins _____ 287—87 X |
| 3,166,943 | 1/1965 | Simmen _____ 74—18 |

FOREIGN PATENTS 1,036,586   8/1958   Germany.

CARL W. TOMLIN, *Primary Examiner.*

EDWARD C. ALLEN, *Examiner.*

A. V. KUNDRAT, *Assistant Examiner.*